US012581149B2

(12) United States Patent
Clark et al.

(10) Patent No.: US 12,581,149 B2
(45) Date of Patent: Mar. 17, 2026

(54) ORIGINATING CLIENT BUFFERED STREAMING

(71) Applicant: CSR Lab LLC, Morristown, TN (US)

(72) Inventors: Christopher M. Clark, Charlotte, NC (US); David L. Johansen, Draper, UT (US)

(73) Assignee: CSR Lab, LLC, Morristown, TN (US)

( * ) Notice: Subject to any disclaimer, the term of this patent is extended or adjusted under 35 U.S.C. 154(b) by 28 days.

(21) Appl. No.: 18/490,115

(22) Filed: Oct. 19, 2023

(65) Prior Publication Data

US 2024/0187675 A1     Jun. 6, 2024

Related U.S. Application Data

(60) Provisional application No. 63/380,084, filed on Oct. 19, 2022.

(51) Int. Cl.
*H04N 21/2743* (2011.01)
*H04N 21/2187* (2011.01)
*H04N 21/234* (2011.01)
*H04N 21/44* (2011.01)

(52) U.S. Cl.
CPC ..... *H04N 21/2743* (2013.01); *H04N 21/2187* (2013.01); *H04N 21/23406* (2013.01); *H04N 21/44004* (2013.01); *H04N 21/44008* (2013.01)

(58) Field of Classification Search
CPC ........... H04N 21/2743; H04N 21/2187; H04N 21/23406; H04N 21/44004; H04N 21/44008
See application file for complete search history.

(56) References Cited

U.S. PATENT DOCUMENTS

| | | | | |
|---|---|---|---|---|
| 2012/0301100 | A1* | 11/2012 | Pereira ..................... | H04N 5/77 |
| | | | | 386/E5.002 |
| 2014/0150032 | A1* | 5/2014 | Pacor ............... | H04N 21/41407 |
| | | | | 725/62 |
| 2017/0006320 | A1* | 1/2017 | Beattie, Jr. ......... | H04N 21/2353 |
| 2018/0220189 | A1* | 8/2018 | Hodge ................ | G06F 16/7837 |
| 2020/0267437 | A1* | 8/2020 | Pantos ............. | H04N 21/26258 |

* cited by examiner

*Primary Examiner* — Alazar Tilahun
(74) *Attorney, Agent, or Firm* — TechnicalAttorney; Rick Barnes

(57) ABSTRACT

A recorded event presentation system, including a camera that is adapted to capture and provide a video stream at a resolution. An originating client is adapted to receive the video stream from the camera at the resolution and provide the entire video stream at the resolution across a network at a variable bandwidth. When the bandwidth is relatively larger, then the video stream is provided at the resolution at a relatively faster speed. When the bandwidth is relatively smaller, then the video stream is provided at the resolution at a relatively slower speed. A server is adapted to receive the video stream from the originating client, and provide the video stream to a viewing client.

20 Claims, 1 Drawing Sheet

100

Originating Client 102

| Cameras 112 | Sensors 114 |
| Buffer 116 | Output 118 |
| Display 120 | Interface 122 |

108

Server 104

| Input 124 | Buffer 126 |
| Storage 128 | Output 130 |
| Display 132 | Interface 134 |
| Power 136 | Recognition 138 |

110

Viewing Client 106

| Input 140 | Display 142 |

100
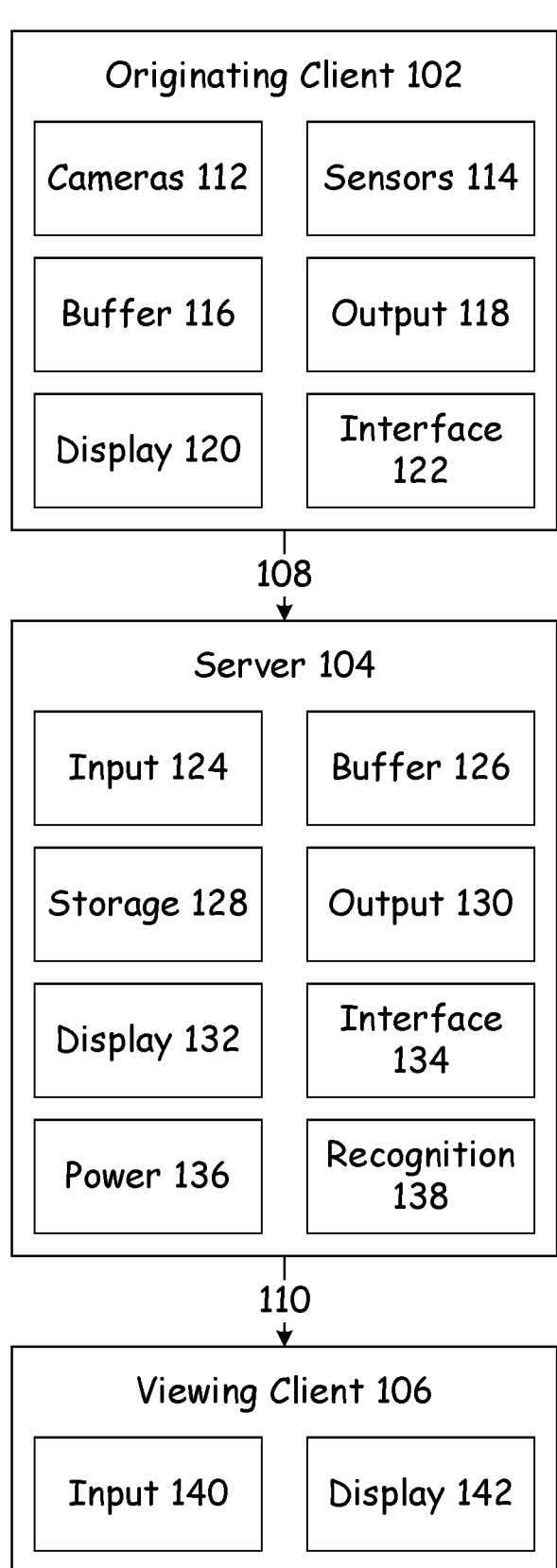

ORIGINATING CLIENT BUFFERED STREAMING

FIELD

This invention relates to the field of streaming video. More particularly, this invention relates to buffering streaming video at an originating client so as to have no drop-outs in the video stream between the originating client and a receiving server.

As used herein, the term "video" is used as an abbreviation to generally refer to a data stream that includes video data.

Live-stream video systems are typically comprised of a server with an input that receives the video stream from an originating client. The server duplicates the stream so as to retain a copy of the stream that is stored for later access. An output on the server forwards the stream to a viewing client. Some systems employ a predetermined temporal buffer of some duration, such as a few seconds, which is held relatively constant throughout the duration of the stream. Such temporal buffers typically do not abrogate the designation of the stream as being a live- or real-time stream.

Current live-streaming systems are designed to maintain the continuity or real-time nature of the video experience as the primary goal of the system. In other words, the live-streaming system will adjust certain variables in the stream so as to maintain, in as far as possible, the real-time nature of the live-stream.

Thus, such systems, when they encounter low or otherwise restricted network bandwidth between the client and the server, will change various video parameters, such as the resolution, frame-rate, or other decimation of the video, in order to lower the amount of data that needs to be transferred, and thus maintain the real-time nature of the stream. Further, if the network connection drops completely, the video captured by the originating client during the down time is not transferred at all. When the network connection is reestablished, the live-stream continues from the current point in time, and all of the video that was captured at the originating client during the down time is lost.

However, in many applications, such as high-end performance analysis, the quality, reliability, confidence, and multiple video angles of the video stream are more important parameters than the live, real-time nature of the video.

The current way video is used with high-end performance analysis, so as to not lose any video content or quality, is to record via a recording device and then transfer the video to a computer. However, this creates additional steps for the user that take time and some expertise. The user has to wait until the recording is completed. Then they have to find the video file on the device. If they want to provide the video for viewing, or make clips, they have to transfer the file to a computer to use the video, which could include multiple transfers, such as first from the recording device to a computer, then to a video application, and then finally to a server for remote users to view.

These steps cause the time between performance and video review to be hours or days. It also discourages the use of multiple camera angles, because the amount of work for the user increases dramatically for each additional camera angle.

What is needed, therefore, is a system that tends to reduce issues such as those described above, at least in part.

BRIEF DESCRIPTION OF THE DRAWING

Further advantages of the invention are apparent by reference to the detailed description when considered in conjunction with the FIGURE, and wherein the FIGURE depicts a functional block diagram of a buffered originating client video streaming system according to the presented embodiments.

SUMMARY

The above and other needs are met by a recorded event presentation system, including a camera that is adapted to capture and provide a video stream at a resolution. An originating client is adapted to receive the video stream from the camera at the resolution and provide the entire video stream at the resolution across a network at a variable bandwidth. When the bandwidth is relatively larger, then the video stream is provided at the resolution at a relatively faster speed. When the bandwidth is relatively smaller, then the video stream is provided at the resolution at a relatively slower speed. A server is adapted to receive the video stream from the originating client, and provide the video stream to a viewing client.

In some embodiments according to this aspect of the present disclosure, the camera is integrated into the originating client. In some embodiments, the video stream is provided by the originating client with a time code indicating a time at which the video stream was captured.

In some embodiments, the originating client includes a buffer adapted to buffer the video stream when the bandwidth is too low for the originating client to provide the video stream at a rate equal to or great than a rate at which the originating client receives the video stream from the camera. In some embodiments, the originating client is adapted to provide the video stream disposed in the buffer at an increased rate that is faster than the video stream is received from the camera, when the bandwidth of the network is sufficient to support the increased rate, until the buffer is cleared.

In some embodiments, the originating client provides a camera capture timecode associated with the video stream, such that the server does not use a receiving time of the video stream from the originating client as the camera capture time of the video stream. In some embodiments, multiple originating clients each provide video streams to the server, and the server associates the video streams one to another using camera capture timecodes associated with the video streams. In some embodiments, the server provides the video stream to multiple viewing clients, where multiple viewing clients can selectively view different instances of a same or different video streams. In some embodiments, the server includes event recognition computer vision software adapted to analyze the video stream as it is received by the server, and creates event clips that are made available to the viewing client either prior to or after receipt of an entirety of the video stream. In some embodiments, the server includes a storage adapted to store multiple video streams, such that the viewing client is able to selectively chose a desired one of the multiple video streams for receipt and display.

DESCRIPTION

The embodiments described herein maintain the quality of the video as a primary factor, and continue to upload the stream from the originating client with the available network bandwidth, whatever it might be, even if this sacrifices the real-time nature of the stream as delivered to either the server or the viewing clients.

With reference now to the FIGURE, there is depicted a system 100 according to the present embodiments. These embodiments allow the originating client 102 to start a stream in an application that is running on the originating client 102, where the originating client 102 is either hardwired to or incorporates one or more video camera 112, regardless of whether a network connection 108 is available to the originating client 102.

In some embodiments the originating client 102 also includes other types of sensor 114, such as GPS sensors, time sensors, and so forth. A buffer 116 is provided in some embodiments, such as to buffer the captured video so that it does not at least one of underrun or overrun the output 118, or other components of the system 100. The output 118 formats the captured video and other data provided by the originating client 102 for the network transmission 108. A local display 120 on the originating client 102 is used in some embodiments to present to the user of the originating client 102 the video that is captures by the cameras 112, or other information that is gathered by the sensors 114. An interface 122 allows the user of the originating client 102 to control various aspects of at least one of the hardware and the software of the originating client 102. In some embodiments the originating client 102 is a smartphone or other cellular phone.

The application receives the stream from the camera 112 and uploads the stream to the server 104 using whatever bandwidth is available on the network 108, to send the video stream as fast as possible. Timecode information, regarding when the video was recorded, is passed in the video metadata, so that if a video fragment is actually uploaded hours after it was recorded, the server 104 is aware of the true timestamp for the video fragment. Other information, such as from the sensors 114 or otherwise, can also be sent, in some embodiments, with timecode information, so that the other information can be temporally paired with the video stream or other presented data.

This allows the originating client 102 to function in a consistent manner, regardless of whether the client 102 has a good or bad cellular signal, or other type of network connection, at a location with WiFi, or in the country with no network connection at all. If the network connection 108 is slower than the capture of the video stream by the cameras 112, then the buffer 116 can hold the video stream, and any other data generated by the originating client 102, until the originating client 102 is able to transmit the gathered data. Once the originating client 102 gets a network connection 108 it will start the upload of the video. If the network connection 108 is sufficiently fast and stable, the system 100 can provide a live streaming experience to viewing clients 106 that want to watch it live. If the size of the delayed video stream is larger than the buffer 116, then the video can be also be stored in a storage device in the originating client 102.

In some embodiments there are multiple originating clients 102 that are recording multiple different angles of the same or related content at the same time. In a traditional system, such multiple related streams would tend to consume too much bandwidth and cannot provide a true live streaming experience for all angles. In some embodiments of the invention the multiple client devices 102 on the same network 108 coordinate to make efficient use of the bandwidth (i.e. allow one to stay real time while the other slows down or stops) or operate independently and be handled well enough for both clients 102, even though the bandwidth is too limited to allow both clients 102 to keep up.

The video and other information that is captured by one or more originating client 102 is streamed to a server 104 that stores the video and makes it available for live-streaming, if applicable, based on the upload bandwidth 108, but also for video-on-demand viewing. Some embodiments of the server 104 include an input 124 through which the video and other information is received, and a buffer 126 that used to handle any overrun that might be generated by the input 124. The video and other information can be stored, in some embodiments, in a storage 128, such as any one or more of a solid state device, hard drive, or other digital repository.

A display 132 presents information in regard to the operation of the server 104 to an operator, and the interface 134 enables the operator to provide input in regard to the operation of the server 104. A power supply 136 provides power to the server 104.

The video is also processed by event recognition computer vision software 138 in the server 104, which analyzes the video as it is being received at the server 104, and cuts event clips that are then made available over the network 110 to viewing clients 106. Other data streams besides or in addition to video can also be aggregated with the video and, via timestamp with the video, to tag event types and people in the video, for example. The viewing clients 106 include an input 140 for receiving the stream produced by the server 104, and a display 142 for presented the stream to a viewer.

In one embodiment, a user at a baseball field with wifi has two portable originating clients 102 (such as tablet computers or smartphones), which are set up to stream video of, and perhaps additional information in regard to, the baseball game from two angles. For a given percentage of the time, the Wifi bandwidth for each of the two originating clients 102 is good enough for each to maintain a high quality livestream with the server 104, but for the rest of time, the bandwidth available to the originating clients 102 is severely limited. In a current live streaming environment, in the event where the connection was not good, either the originating client 102 would lower the quality of the video it is uploading, so as to maintain a continual video stream, or it would fail to provide any video at all. The dropped video would not ever make it to the server 104 and would be lost forever.

With an embodiment of the system 100 as presently described, during the time with the unfavorable connection, the originating client 102 is uploading video at whatever speed it can, while maintaining the integrity and full manually-selected quality of the video stream, while buffering 116 within the originating 102 client those portions of the live stream that cannot be uploaded via the network 108 in real time. Then, in those times when the connection 108 is good, the connection 108 might be good enough for the originating client 102 to upload the video stream at a speed greater than real time, eventually catching up with real time, and then proceeding with the upload in real time while it can.

Regardless of the time that it might take, and whether it is performed in real time or on a delayed basis, all of the video captured on the originating client 102 will be uploaded to the server 104 in its full, selected resolution. The upload process might complete after the end of the game, or it might complete when the user takes the originating client 102 to another location and connects it to a wifi or other relatively high speed signal. Regardless of the timing of when the video is received by the server 104, all of the different video streams are synced, such as by the transmitted timecodes, and processed immediately upon receiving.

On the server side 104, the event recognition software 138 is running on the video that is received from all of the originating clients 102, so even if a continuous live stream cannot be provided to end users 106 wanting to watch the game, they will still be able to see clips automatically generated by the software 138 immediately after creation. So, for example, if the video shows up 20-30 seconds after what would be considered live, clips are still generated and made available to the end users 106 who are watching the game. The video-on-demand of the game is also available at any later point in time.

In some embodiments the originating client includes event recognition computer vision software and can prioritize the upload of different segments of the video based on event recognition or included event recognition information in the metadata.

In some embodiments the originating client includes audio processing software that can listen for audio triggers to use for event detection and meta data information.

The user may have a restrictive, throttled, or costly network 108 on the originating client 102. In some embodiments, the application can be configured to only send specific clips over the network 108, and send the other sections of the video via an alternate network connection, such as at a later time. These specific clips could be determined by event recognition computer vision software running on the originating client 102, or it could be a request from the server 104 to send a clip, such as from timestamp x to y. The user could configure, either on the originating client 102 or on the server 104, to only send specific event-type clips over the slower or more costly network 108.

In another embodiment, the user could configure a maximum amount of data that can be sent via the network 108. Then the originating client 102 sends the video until that maximum is met for the day. Then it will hold the balance of the video for subsequent transmission over a different network, when such becomes available. In one embodiment, the application provides the user with the ability to override this maximum amount, for specific clips that are requested from the server 104.

In some embodiments, the user connects the video to an event by either selecting the event from a provided schedule, or creating the event on the originating client 102, which communicates the information to the server 104, so that when the video is received by the server 104 it can connect the video stream to the event for at least one of organization, review, and playback.

In some embodiments, the originating client 102 sends video to the server 104 without defining an event to connect the video too. In such a case, the video is connected to the user on the server 104. Then, either after the video has been sent or while it is being sent, a user can log into the server 104 and connect the video to an event, by either selecting and event or creating an event on the server 104.

In some embodiments, the originating client 102 handles multiple different video recordings in the buffer 116. In the case where the originating client 102 is in a location with poor or no network connection 108, it can record videos of multiple events for multiple hours. For example, a baseball double-header. By the time the originating client 102 needs to record the second game, it may not be done uploading the first game. If bandwidth increases, then the originating client 102 can upload the first game and the second game at the same time. The user can also instruct the originating client 102 via the interface 122 to pause the upload of the first game in order to maximize the bandwidth for the second game. The user can see how much video remains to be sent, how much video has been sent, and other details of the transfer of the video to the server 104. The user can choose to delete information that is stored in the buffer 116.

In some embodiments, the server 104 can provide information to the viewing client 106 about the stability of the video being sent by the originating client 104, regarding whether the stream will be able to be watched, and when it might be available to be watched. Viewing clients 106 can subscribe to be alerted via at least one of text message, email, and other messaging system, when other originating clients 102, or specific events, start sending video to the server 104.

In another embodiment, the originating client 102 includes a security camera, and allows the video to continue to record even if the network 108 is interrupted.

Various embodiments of the present disclosure make video delivery more simple. There is no problem if the user doesn't have an adequate network 108 at the time of the event. Similarly, there is no problem if the user didn't schedule the event in advance. Several originating clients 102 can record the event, in whole or in part, at various times and from various perspectives, and the timecodes will allow the different video streams to be properly associated.

In another embodiment, a four-field soccer complex has six cellular tablets setup per field, for a total of twenty-four cellular tablets. There are four games on each field in a single day, for a total of sixteen games per day.

In an effort to reduce cellular network costs, the tablets store all the video to the buffer. The tablets are collected after the last game, to be charged and upload the video via Wifi. Each of the tablets is also connected to the server via its cellular connection, and the server has been provided with information regarding which field each tablet is assigned to and what video angle it is recording, for example "west goal," "mid-field," and so forth.

The server receives an event trigger, such as a goal that was scored or a replay challenge. This event trigger could come from a user via a different user interface connected with the server, such as a charting application, or the trigger could be from computer vision software running on one of the tablets. The server, based on this event trigger, then sends a command to the application on all or a specific set of the tablets, based on the video angle and field, to send a video clip starting at a specific time for a specific duration. For example, start at '2023-08-23T19:08:34.8440928Z' for a duration of twelve seconds. Then, the originating client applications on the devices that receive this message send this video clip over their cellular connection.

This embodiment provides a robust video solution without having to pay for installed hardware or robust network. In this embodiment, viewers of the game online see clips of important events, such as goals, in near real-time, while being able to watch the entire game, and see clips of other events, at a later time.

The previously described embodiment of specific video clips being requested by the server also works in conjunction with embodiments where the devices are continuously sending the video. For example, if the buffer is large, meaning the originating client is far behind in terms of live video delivered to the server, the server could request that the originating client prioritize a specific section of the video for delivery. The use case of this could be a coach's challenge or a game winning play, or whenever there is heightened value placed on the real-time nature of the review of requested video.

In yet another embodiment, a golfer is practicing on a driving range with a smartphone and a tablet. The smartphone and tablet are configured as originating clients 102, and have enough available space for the video. The smartphone is placed perpendicular to the swing path, and starts recording. The tablet is placed behind him looking parallel to the swing path, looking down the ball flight path, and starts recording. No live video is delivered to any network 108 that may be available.

The originating clients 102 are configured to recognize when the golfer says either one of "good swing" and "bad swing." He can also say "5 iron" or another golf club along with "good swing." Upon such statements, the originating client 102 cuts a clip of five seconds, back five seconds from when it recognized the spoken statement, adds the audio information to the clip as metadata, such as "five iron" and "good swing."

The golfer starts to hit balls, and after the first five warm-up swings, hits the sixth ball and says "good swing, five iron," then hits another shot and says "bad swing, five iron." He continues such practice for an hour, switching clubs, taking breaks, and so forth. Finally, the golfer is ready to move to the putting break. He picks up the smartphone and tablet and stops the video recording process.

Then he opens an application that connects with his account on the server and starts to review the video clips that were uploaded. He can also filter them by "good" or "bad" swings, as well as different club types, because of the metadata sent. Each video clip also has both angles (smartphone angle and tablet angle) stacked on top of each other, so he can pause, slow down, and rewind a clip that shows his swing from both the front as well as the back.

Then the golfer goes to the green and setups up both the devices, presses record and does the same thing again. When he leaves and gets to a place with a desired network 108, the devices upload the entire or desired portions of the video sessions. Alternately, the video is deleted from the buffer 116, because the clips that have been transferred to the server 104 are sufficient. If the golfer has a swing coach or other interested party, that person can see the clips that were cut in near real-time as they were uploaded to the server 104 during the practice session. For example, if the golfer's coach was on the driving range as well, he or she could review a past swing's video from two angles, within a handful of seconds of it happening, without the golfer having to stop or having to touch the devices recording the video.

As used herein, the phrase "at least one of A, B, and C" means all possible combinations of none or multiple instances of each of A, B, and C, but at least one A, or one B, or one C. For example, and without limitation: Ax1, Ax2+Bx1, Cx2, Ax1+Bx1+Cx1, Ax7+Bx12+Cx113. It does not mean Ax0+Bx0+Cx0.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A recorded event presentation system, comprising:
a camera adapted to capture and provide a video stream at a resolution, an originating client adapted to receive the video stream from the camera at the resolution and provide the entire video stream at the resolution across a network at a variable bandwidth, such that when the bandwidth is relatively larger, the video stream is provided at the resolution at a relatively faster speed, and when the bandwidth is relatively smaller, the video stream is provided at the resolution at a relatively slower speed, and a server adapted to receive the video stream from the originating client, and provide the video stream to a viewing client.

2. The presentation system of claim 1, wherein the camera is integrated into the originating client.

3. The presentation system of claim 1, wherein the video stream is provided by the originating client with a time code indicating a time at which the video stream was captured.

4. The presentation system of claim 1, wherein the originating client includes a buffer adapted to buffer the video stream when the bandwidth is too low for the originating client to provide the video stream at a rate equal to or great than a rate at which the originating client receives the video stream from the camera.

5. The presentation system of claim 4, wherein the originating client is adapted to provide the video stream disposed in the buffer at an increased rate that is faster than the video stream is received from the camera, when the bandwidth of the network is sufficient to support the increased rate, until the buffer is cleared.

6. The presentation system of claim 1, wherein the originating client provides a camera capture timecode associated with the video stream, such that the server does not use a receiving time of the video stream from the originating client as the camera capture time of the video stream.

7. The presentation system of claim 1, further comprising multiple originating clients that each provide video streams to the server, and the server associates the video streams one to another using camera capture timecodes associated with the video streams.

8. The presentation system of claim 1, wherein the server provides the video stream to multiple viewing clients, where the multiple viewing clients can selectively view different instances of a same or different video streams.

9. The presentation system of claim 1, wherein the server includes event recognition computer vision software adapted to analyze the video stream as it is received by the server, and creates event clips that are made available to the viewing client either prior to or after receipt of an entirety of the video stream.

10. The presentation system of claim 1, wherein the server includes a storage adapted to store multiple video streams, such that the viewing client is able to selectively chose a desired one of the multiple video streams for receipt and display.

11. A recorded event presentation system, comprising:
a camera adapted to capture and provide a video stream at a resolution, and
an originating client adapted to receive the video stream from the camera at the resolution and provide the entire video stream at the resolution across a network at a variable bandwidth, such that when the bandwidth is relatively larger, the video stream is provided at the resolution at a relatively faster speed, and when the bandwidth is relatively smaller, the video stream is provided at the resolution at a relatively slower speed.

12. The presentation system of claim 11, wherein the camera is integrated into the originating client.

13. The presentation system of claim 11, wherein the video stream is provided by the originating client with a time code indicating a time at which the video stream was captured.

14. The presentation system of claim 11, wherein the originating client includes a buffer adapted to buffer the video stream when the bandwidth is too low for the originating client to provide the video stream at a rate equal to or great than a rate at which the originating client receives the video stream from the camera.

15. The presentation system of claim 14, wherein the originating client is adapted to provide the video stream disposed in the buffer at an increased rate that is faster than the video stream is received from the camera, when the bandwidth of the network is sufficient to support the increased rate, until the buffer is cleared.

16. The presentation system of claim 11, wherein the originating client provides a camera capture timecode associated with the video stream, such that a server receiving the video stream does not use a receiving time of the video stream from the originating client as the camera capture time of the video stream.

17. The presentation system of claim 11, further comprising multiple originating clients that each provide video streams to a server, and the server associates the video streams one to another using camera capture timecodes associated with the video streams.

18. The presentation system of claim 11, further comprising a server adapted to receive the video stream from the originating client, and the server provides the video stream to multiple viewing clients, where the multiple viewing clients can selectively view different instances of a same or different video streams.

19. The presentation system of claim 11, further comprising a server adapted to receive the video stream from the originating client, and the server includes event recognition computer vision software adapted to analyze the video stream as it is received by the server, and creates event clips that are made available to a viewing client either prior to or after receipt of an entirety of the video stream.

20. The presentation system of claim 1, further comprising a server adapted to receive the video stream from the originating client, and the server includes a storage adapted to store multiple video streams, such that a viewing client is able to selectively chose a desired one of the multiple video streams for receipt and display.

\* \* \* \* \*